United States Patent
Barcin

(10) Patent No.: US 8,806,979 B2
(45) Date of Patent: Aug. 19, 2014

(54) OPERATING MECHANISM FOR A PARKING BRAKE

(75) Inventor: Baris Barcin, Leinfelden-Echterdingen (DE)

(73) Assignee: Dietz-automotive GmbH & Co. KG, Dettingen/Teck (DE)

( * ) Notice: Subject to any disclaimer, the term of this patent is extended or adjusted under 35 U.S.C. 154(b) by 344 days.

(21) Appl. No.: 12/785,768

(22) Filed: May 24, 2010

(65) Prior Publication Data
US 2010/0294075 A1    Nov. 25, 2010

(30) Foreign Application Priority Data

May 22, 2009  (DE) .......................... 10 2009 022 296
May 23, 2009  (DE) .......................... 10 2009 022 461

(51) Int. Cl.
*B60T 7/08*   (2006.01)

(52) U.S. Cl.
USPC .............................................. 74/535; 74/523

(58) Field of Classification Search
USPC ............... 74/491, 501.6, 523, 528, 533–538, 74/577 S, 577 R; 188/196 B
IPC ....................................................... B60T 7/08
See application file for complete search history.

(56) References Cited

U.S. PATENT DOCUMENTS

| | | | |
|---|---|---|---|
| 935,581 A | 9/1909 | Bowman | |
| 2,168,567 A * | 8/1939 | Gould | 74/537 |
| 2,808,734 A | 10/1957 | Ortner | |
| 3,109,320 A | 11/1963 | Krautwurst | |
| 3,310,995 A | 3/1967 | Buchwald | |
| 3,580,104 A | 5/1971 | Yashiro et al. | |
| 3,901,100 A | 8/1975 | Iida et al. | |
| 4,212,211 A * | 7/1980 | Rickert | 74/538 |
| 4,280,741 A * | 7/1981 | Stoll | 384/16 |
| 4,311,060 A | 1/1982 | Kawaguchi et al. | |
| 4,403,524 A | 9/1983 | Gurney | |
| 4,515,036 A | 5/1985 | Dotson | |
| 5,247,850 A | 9/1993 | Lenzke | |
| 5,272,935 A | 12/1993 | Heinemann et al. | |
| 5,448,928 A | 9/1995 | Harger | |

(Continued)

FOREIGN PATENT DOCUMENTS

| | | | | |
|---|---|---|---|---|
| DE | 3103658 A1 * | 9/1982 | ............... | B60T 7/10 |
| DE | 3709418 A1 * | 9/1988 | ............... | B60T 7/10 |

(Continued)

OTHER PUBLICATIONS

German Office Action issued in related German Application No. 10 2009 022 461.0-21 dated Apr. 6, 2010, plus English Translation.

(Continued)

*Primary Examiner* — Thomas Diaz
(74) *Attorney, Agent, or Firm* — Venable LLP; Steven J. Schwarz; Robert Kinberg

(57) ABSTRACT

An operating mechanism for a parking brake includes a manual brake lever pivotably coupled to a bearing block, a locking device adapted to secure the manual brake lever in a predetermined pivoting position, an actuating rod guided inside the manual brake lever and operatively connected to the locking device, and a guiding device for the actuating rod located on the manual brake lever. The guiding device comprises a U-shaped profile having an opening oriented toward a side of the manual brake lever. The opening is adapted to receive the actuating rod.

6 Claims, 3 Drawing Sheets

(56) References Cited

U.S. PATENT DOCUMENTS

| | | | |
|---|---|---|---|
| 5,560,082 A | 10/1996 | Vetter | |
| 5,645,155 A * | 7/1997 | Houghton | 193/35 R |
| 5,699,698 A | 12/1997 | Geyer | |
| 5,735,178 A * | 4/1998 | Barbunopulos | 74/535 |
| 5,907,977 A | 6/1999 | Huebner et al. | |
| 5,950,496 A | 9/1999 | Rampp | |
| 5,992,264 A | 11/1999 | Brock, Sr. | |
| 6,016,718 A | 1/2000 | Park et al. | |
| 6,286,389 B1 | 9/2001 | Papadatos | |
| 6,837,127 B2 | 1/2005 | Schumacher | |
| 6,915,719 B2 | 7/2005 | Joo | |
| 6,973,852 B2 | 12/2005 | Shin et al. | |
| 7,140,476 B2 * | 11/2006 | Hilss et al. | 188/265 |
| 7,152,508 B2 | 12/2006 | McCalley, Jr. et al. | |
| 7,475,615 B2 | 1/2009 | Revelis | |
| 7,526,981 B2 | 5/2009 | Ferenc | |
| 7,779,723 B2 | 8/2010 | Kim | |
| 8,230,757 B2 | 7/2012 | Nocko et al. | |
| 2003/0177856 A1 | 9/2003 | Reese et al. | |
| 2006/0175157 A1 * | 8/2006 | Villa et al. | 188/196 B |
| 2007/0175291 A1 | 8/2007 | Kim | |
| 2010/0005922 A1 | 1/2010 | Holland et al. | |
| 2010/0300241 A1 | 12/2010 | Barcin | |
| 2010/0326228 A1 | 12/2010 | Barcin | |

FOREIGN PATENT DOCUMENTS

| | | | | |
|---|---|---|---|---|
| DE | 3820978 | | 12/1989 | |
| DE | 196-40-720 | | 9/1992 | |
| DE | 195-21-1159 A1 | | 12/1996 | |
| DE | 19954813 A1 | * | 5/2001 | B60T 7/10 |
| DE | 100-06-827 A1 | | 9/2001 | |
| DE | 10-2005-057-037 A1 | | 6/2007 | |
| EP | 476208 A1 | * | 3/1992 | B60T 7/10 |
| EP | 790165 A1 | * | 8/1997 | B60T 7/10 |
| EP | 1127760 A2 | * | 8/2001 | B60T 7/10 |
| EP | 1273495 A2 | | 1/2003 | |
| JP | 56-039356 A | | 4/1981 | |

OTHER PUBLICATIONS

German Office Action issued in related German Application No. DE 10 2009 022 656.7 dated Feb. 22, 2010, plus English Translation.

German Office Action issued in related German Application No. 10 2009 022 460.2 dated Feb. 22, 2010, plus English Translation.

Office Action issued in U.S. Appl. No. 12/785,904 on Nov. 19, 2013.

* cited by examiner

OPERATING MECHANISM FOR A PARKING BRAKE

CROSS-REFERENCE TO RELATED APPLICATIONS

This application claims priority under 35 U.S.C. §119 to German Patent Application No. 10 2009 022 296.0, filed in Germany on May 22, 2009, and German Patent Application No. 10 2009 022 461.0, filed in Germany on May 23, 2009. The entire subject matter of the foregoing two applications is expressly incorporated herein by reference.

BACKGROUND OF THE INVENTION

The present invention relates to an operating mechanism for a parking brake.

An operating mechanism of this type is known from German Document DE 195 21 159 C2. This operating mechanism comprises a manual brake lever which is positioned pivoting on a bearing block. The parking brake is operated with the aid of an actuating rod which engages in a locking device. The locking device comprises a locking segment and a detent. The locking segment is attached to the bearing block and comprises a bar with latching teeth. The detent is positioned pivoting on a bearing pivot belonging to the manual brake lever and is pre-tensioned via a spring element. A push button is provided on the front end of the actuating rod, wherein this button projects over the tubular holder and can be depressed by an operator.

The manual brake lever must be pivoted in order to operate the parking brake, wherein this pivoting movement is transmitted via the actuating rod to the detent. In one end position, the detent engages in the locking segment and thus secures the manual brake lever in the respective position.

The push button is depressed to disengage the manual brake lever from this position, thereby releasing the detent from the locking segment. The manual brake lever can thus be returned once more to the starting position.

The manual brake lever consists of two shell halves which are closed on the tops by a cover panel. The shell halves are each provided with a semi-circular attachment for accommodating the actuating rod. These attachments when combined form a tubular holder into which the front portion of the actuating rod is inserted. The back portion of the actuating rod, which extends at an angle relative to the front portion, is connected to the detent of the actuating rod.

The shell halves for the manual brake lever advantageously consist of a light-metal casting alloy. The manual brake lever thus has a high stability but also an undesirably high weight because of its solid, multi-part construction.

A further disadvantage is the undesirably high cost for producing the multi-part manual brake lever. In addition, the assembly of an operating mechanism provided with a manual brake lever of this type is undesirably complicated. The actuating rod must be inserted into an extension on a shell half before the shell halves are combined, and the actuating rod must furthermore also be joined articulated to the detent. Finally, the shell halves must be joined and the cover panel placed onto the shell halves.

SUMMARY OF THE INVENTION

It is an object of the present invention to design an operating mechanism of the aforementioned type in such a way that it has the highest possible stability with the lowest possible weight as well as low production costs.

According to an embodiment, an operating mechanism for a parking brake comprises: a manual brake lever pivotably coupled to a bearing block; a locking device adapted to secure the manual brake lever in a predetermined pivoting position; an actuating rod guided inside the manual brake lever and operatively connected to the locking device; and a guiding device for the actuating rod located on the manual brake lever, wherein the guiding device comprises a U-shaped profile having an opening oriented toward a side of the manual brake lever, the opening adapted to receive the actuating rod. According to another embodiment, an operating mechanism for a parking brake comprises: a manual brake lever pivotably coupled to a bearing block; a locking device adapted to secure the manual brake lever in a predetermined pivoting position; an actuating rod guided inside the manual brake lever and operatively connected to the locking device; a guiding device for the actuating rod located on the manual brake lever, wherein the actuating rod is displaceable within the guiding device; and at least one position-securing member adapted to prevent the actuating rod from moving out of the guiding device, wherein the at least one position-securing member comprises a guide clip adapted to connect to the guiding device, wherein the guide clip forms a sliding guide for the actuating rod.

The operating mechanism for a parking brake according to the invention is provided with a manual brake lever that is positioned pivoting on a bearing block. With the aid of a locking device, the manual brake lever can be secured in a predetermined pivoting position. The operating mechanism according to the invention is furthermore provided with an actuating rod that is guided inside the manual brake lever and is operatively connected to the locking device. The manual brake lever comprises a guiding device in which the actuating rod is positioned so as to be displaceable in the longitudinal direction. The guiding device can be embodied as a U-shaped profile with an opening located on the side of the manual brake lever into which the actuating rod can be inserted.

A first advantage of the operating mechanism according to the invention is that by embodying the guiding device as a U-shaped profile, the weight of the manual brake lever can be kept low.

A further advantage of the operating mechanism according to the invention is that by inserting the actuating rod from the side into the guiding device, it can be installed easily and quickly.

The easy installation of the actuating rod is furthermore aided by the fact that the actuating rod can easily be prevented from moving out of the guiding device by using position-securing means, wherein it is particularly advantageous that the position-securing means can be made available without high cost and structural expenditure.

According to the invention, a first position-securing means may take the form of a guide clip which can be attached to the guiding device to form a sliding guide for the actuating rod. The guide clip is clipped into or snapped into the guiding device, thereby making it easy to install the clip without tools on the guiding device.

It is particularly advantageous if the guide clip is provided with a projection which rests flat on the actuating rod if the guide clip is attached to the guiding device.

A projection of this type makes it particularly easy to compensate for any play between the guide clip and actuating rod. In particular, it is also possible to achieve a reduction in noise during the guiding of the actuating rod inside the guiding device.

The locking device is provided with a locking segment that is attached to the bearing block as well as a movably positioned detent. The detent is joined articulated to the back end of the actuating rod positioned inside the guiding device.

The back end of the guiding device is provided with a receptacle in which a segment of the detent is positioned pivoting in order to form an articulated connection. End stops are provided on the receptacle which function as second position-securing means and ensure that the detent segment does not move out of the receptacle.

Since the detent itself is positioned on the manual brake lever so as to be movable, while also being secured against slipping out, the end stops on the receptacle prevent the actuating rod from slipping out of the guiding device.

While the second position-securing means embodied in this way is provided on the back end of the guiding device, the first position-securing means formed by the guide clip is arranged advantageously on the front end of the guiding device, so that the actuating rod is held securely and over its total length inside the U-shaped profile of the guiding device. It is particularly advantageous in this case that no additional elements are required, e.g. guiding sleeves for guiding and for securing the actuating rod.

In the simplest case, the guiding device for the manual brake lever is embodied to extend over its total length along a straight line, which means that the actuating rods can also extend along a straight line. No additional guiding means need to be provided in that case for the sliding guidance of the actuating rod inside the guiding device.

However, due to requirements resulting from a limited installation space for the operating mechanism within the vehicle, it may be necessary for the guiding device to comprise two parts that each extend along a straight line, but are arranged at an angle relative to each other.

The shape of the actuating rod is correspondingly adapted to the shape of the guiding device.

To obtain a perfect guidance of the actuating rod inside the guiding device even with these complex geometries, a pin is provided on the actuating rod as a means for guiding this rod inside the guiding device, wherein this pin moves inside an elongated hole in the guiding device.

As an alternative, the pin as guiding means for guiding the actuating rod inside the guiding device can move inside an elongated hole that is provided on the actuating rod itself.

Guiding means embodied in this way can be produced easily and cheaply and will securely prevent a tilting of the actuating rod inside the guiding device.

BRIEF DESCRIPTION OF THE DRAWINGS

The present invention may be more readily understood from the following detailed description when read in conjunction with the accompanying drawings, in which.

DETAILED DESCRIPTION OF THE PREFERRED EMBODIMENTS

Figure 1:
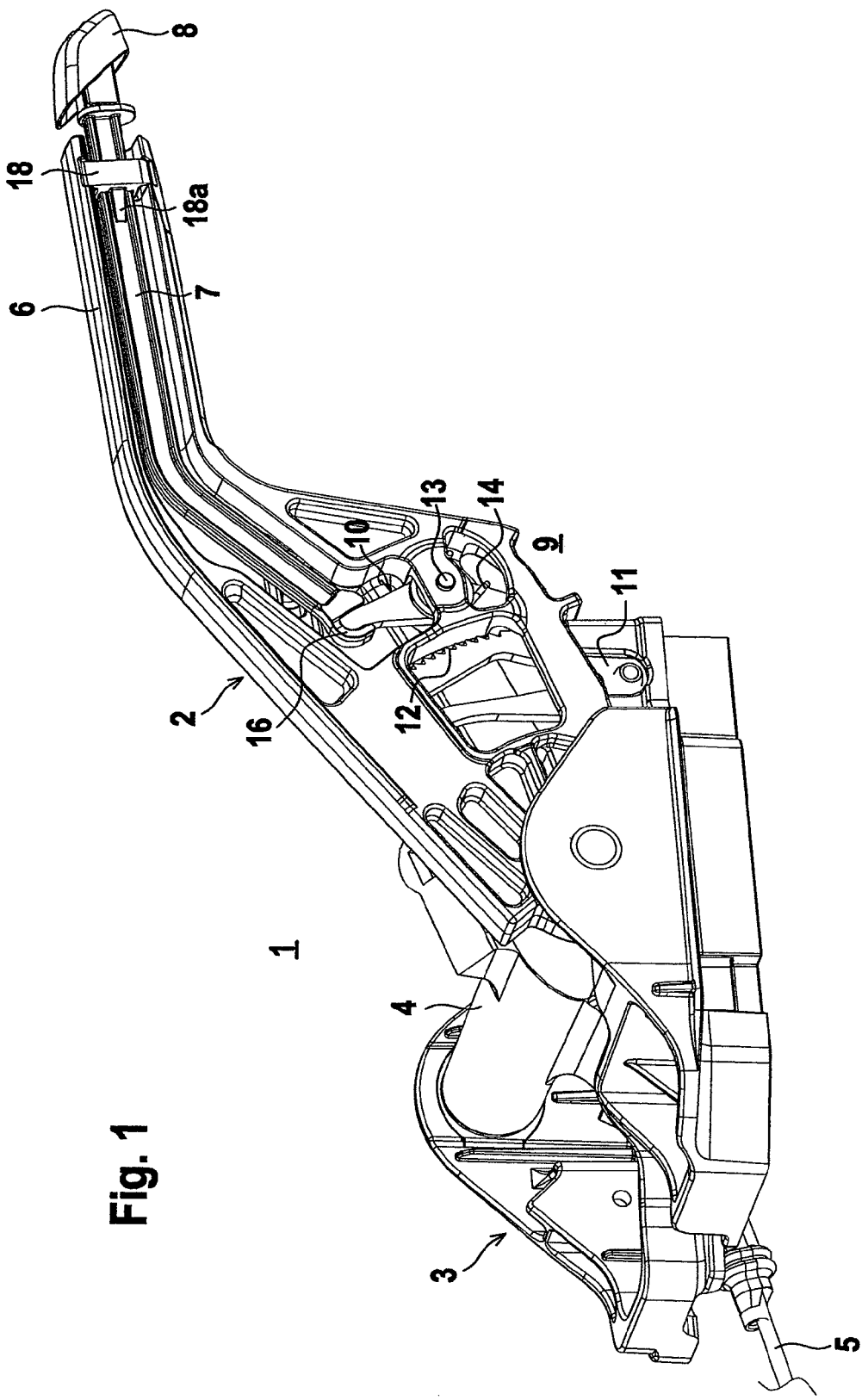
FIG. 1: A first view from the side of an exemplary embodiment of the operating mechanism for a parking brake according to the present invention.
Figure 2:
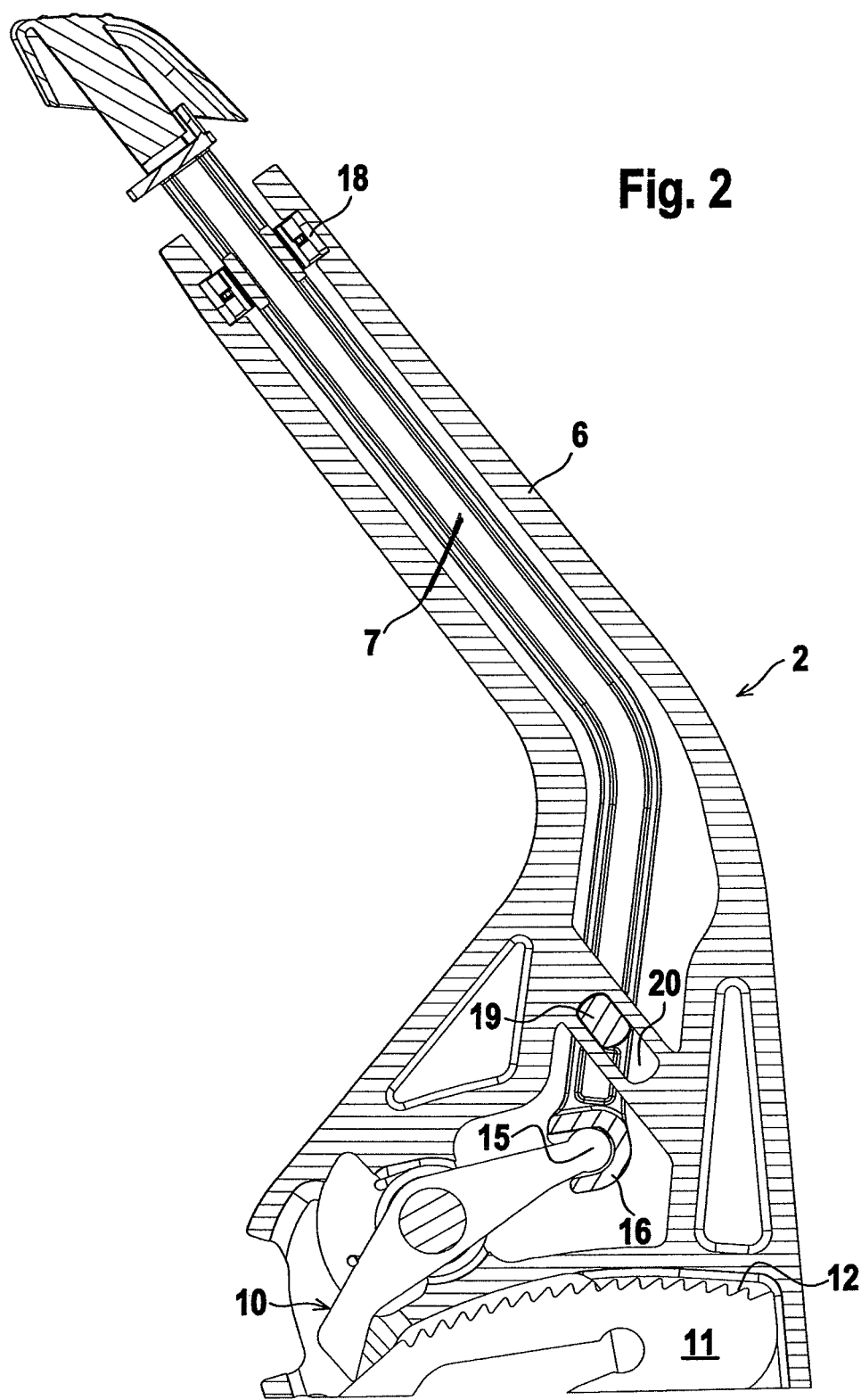
FIG. 2: A second view from the side of a section of the operating mechanism according to the present invention as shown in FIG. 1.
Figure 3:
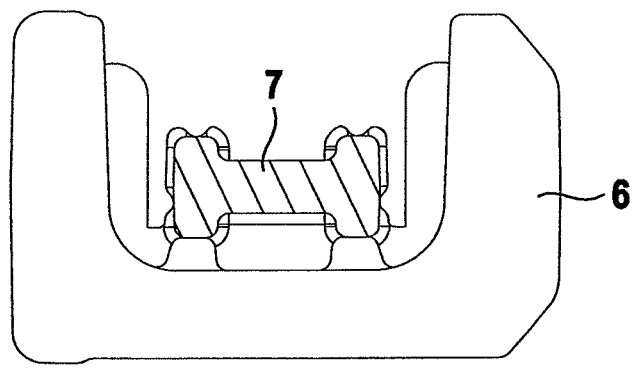
FIG. 3: A cross section through a guiding device for a manual brake lever with therein guided actuating rod.

FIGS. 1 and 2 illustrate an exemplary embodiment of the operating mechanism 1 according to the invention for a vehicle parking brake.

The operating mechanism 1 is provided with a manual brake lever 2 which is positioned pivoting on a bearing block 3. The bearing block 3 is a cast part that is preferably composed of a light-weight metal alloy.

The manual brake lever 2 is furthermore also cast as one piece and is also composed of a light-weight metal alloy. Aluminum or magnesium alloys are preferably used for the bearing block 3 as well as for the manual lever 2. The manual lever 2 is positioned so as to pivot around a horizontally extending pivoting axis, wherein the manual brake lever is attached to a pivot bearing 4 to which a cord 5 is attached.

The respective position of the manual lever 2 is transmitted via this cord 5 to the vehicle parking brake which is not shown herein, wherein this cord 5 here also comprises similar elements, such as cables or rods.

The manual brake lever 2 is provided with a guiding device 6 with therein positioned displaceable actuating rod 7 which in the present case is a rod-shaped plastic part.

In particular FIG. 1 and the cross-sectional representation of the guiding device 6 with therein disposed actuating rod 7 show that the guiding device 6 is embodied in the form of a U-shaped profile with an exposed opening on one side of the manual brake lever 2. As a result of arranging the opening of the U-shaped profile on the side, the actuating rod 7 can be inserted from the side into this guiding device.

To achieve the most compact design possible for the operating mechanism 1, the guiding device 6 does not extend along a straight line. Rather, the guiding device 6 has an angled design and is formed by two straight segments which converge at an obtuse angle. In the area of transition, the guiding device 6 has a somewhat curved shape to which the geometry of the actuating rod 7 is adapted.

In particular FIGS. 1 and 2 illustrate that a push button 8 is arranged on the front end of the actuating rod 7 and projects over the front end of the guiding device 6 where it can be secured with the aid of locking means and the like.

The actuating rod 7 is connected to a locking device 9. With the aid of this locking device 9, the manual brake lever 2 can be secured in a predetermined pivoting position.

The locking device 9 essentially comprises a detent 10 and a locking segment 11. The locking segment 11 is attached to the bearing block 3 and contains a bar with latching teeth 12.

The detent 10 is positioned on a manual brake lever 2 so as to pivot around a horizontally extending pivoting axis with the aid of a bearing pivot 13 and is pre-tensioned via a spring element 14.

The pivoting axis extends through the center of the detent 10, thereby dividing it into two pivoting arms that extend on either side of the pivoting axis. The first pivoting arm of the detent 10 is connected to the actuating rod 7. The second pivoting arm of the detent 10 engages in the locking segment 11. The detent 10 is provided for this with a latching nose at the front end of the second pivoting arm which can engage in the latching teeth 12 of the detent 11.

The push button 8 is depressed to release the detent 10 from the locking segment 11. As a result, the actuating rod 7 is displaced and the detent 10 is released counter to the spring force of the spring element 14 from the locking segment 11.

At the upper end of the first pivoting arm the detent 10 is provided with a segment 15 which serves as connection to the actuating rod 7.

The segment 15 is essentially shaped like a circular disc segment and forms a cross-sectional expansion at the front end of the first pivoting arm for the detent 10.

Figure 4:
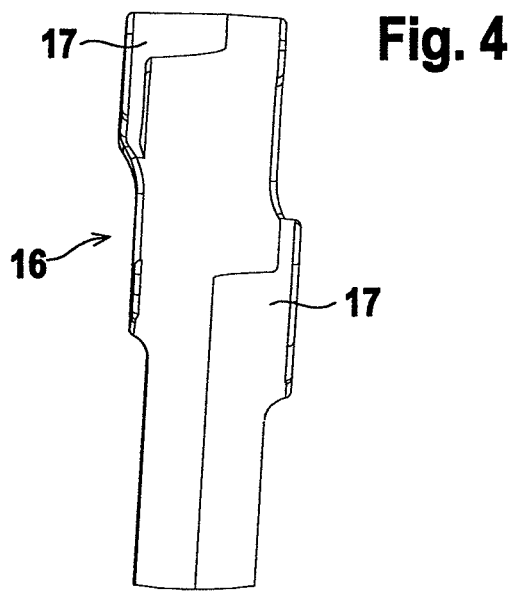
FIG. 4: A detailed view of a receptacle for an actuating rod for the operating mechanism according to FIG. 1.

The segment 15 is positioned pivoting inside a receptacle 16, wherein the receptacle 16 forms the back end of the actuating rod 7. The receptacle 16 takes the form of a half shell that encloses the segment 15. FIG. 4 shows an individual representation of the receptacle 16 with view of the open half shell. The segment 15 is positioned with some play inside the receptacle 16, so that the receptacle 16 can compensate for the play between the detent 10 and the actuating rod 7.

End stops 17, which are arranged offset, are furthermore provided on opposite sides of the receptacle 16 and prevent the segment 15 of the detent 10 from sliding out of the receptacle 16. Since the detent 10 is arranged pivoting but not detachable on the manual brake lever 2, these end stops 17 form position-securing means that prevent the actuating rod 7 from moving out of the guiding device.

A guide clip 18 is provided as a further position-securing means in the region of the front end of the actuating rod 7. The guide clip 18 is snapped into the guiding device 6 and thus forms a sliding guide for the actuating rod 7 which is guided inside the guiding device 6. Owing to this guide clip 18, the actuating rod 7 is secured on its front end to prevent it from moving out of the guiding device 6. The guide clip 18 preferably consists of a plastic part.

FIG. 1 shows that the guide clip 18 is provided with a projection 18a which sits sliding on the actuating rod 7 if the guide clip 18 is snapped into the guiding device 6. For one thing, the guide clip 18 compensates for the play between vehicle and guide clip 18 as well as actuating rod 7, wherein this simultaneously also results in a significant reduction in noise during the operation of the operating mechanism 1.

Since the guiding device 6 does not extend along a straight line, but is embodied at an angle and the shape of the actuating rod 7 is adapted thereto, irregularities can occur during the activation of the push button 8, in particular in the form of a tilting of the actuating rod 7 inside the guiding device 6.

FIG. 2, in particular, shows that suitable guiding means are provided on the actuating rod 7 and the guiding device 6 to avoid this problem. The guiding means in the present case include a pin 19, which ends on the side of the actuating rod 7, and an elongated hole 20 in the guiding device, wherein the pin 19 moves inside the elongated hole 20.

Alternatively, it is also possible to provide the pin 19 on the guiding device 6 and to provide the elongated hole 20 in the actuating rod 7.

It will be understood that the above description of the present invention is susceptible to various modifications, changes and adaptations, and that the same are intended to be comprehended within the meaning and range of equivalents of the appended claims.

The invention claimed is:

1. An operating mechanism for a parking brake, comprising:
   a manual brake lever pivotably coupled to a bearing block;
   a locking device adapted to secure the manual brake lever in a predetermined pivoting position;
   an actuating rod guided inside the manual brake lever and operatively connected to the locking device;
   a guiding device for the actuating rod located on the manual brake lever, wherein the guiding device comprises a U-shaped profile having an opening oriented toward a side of the manual brake lever, the opening adapted to receive the actuating rod; and
   a guide clip adapted to snap onto the guiding device and secure the actuating rod in the opening of the guiding device, wherein the guide clip forms a sliding guide for the actuating rod; and
   a pin provided on the actuating rod, wherein the pin moves inside an elongated hole in the guiding device to guide the actuating rod within the guiding device.

2. The operating mechanism according to claim 1, wherein the guide clip includes a projection adapted to rest flat on the actuating rod when the guide clip is attached to the guiding device.

3. The operating mechanism according to claim 1, wherein the locking device comprises:
   a locking segment attached to the bearing block; and
   a detent, wherein the detent is pivotably connected to a back end of the actuating rod.

4. The operating mechanism according to claim 3, further comprising:
   a receptacle located at the back end of the actuating rod, and
   a segment located on the detent, wherein the receptacle is adapted to pivotably receive the segment of the detent.

5. The operating mechanism according to claim 4, further comprising end stops on the receptacle, wherein the end stops are adapted to prevent the segment of the detent from disengaging from the receptacle.

6. The operating mechanism according to claim 1, wherein the guiding device comprises a first section, and a second section coplanar with the first section within a common plane, wherein the first section and the second section are angled with respect to one another within the common plane.

* * * * *